Nov. 23, 1926.
S. SNYDER
STUD DRIVER
Original Filed July 7, 1923
1,607,804
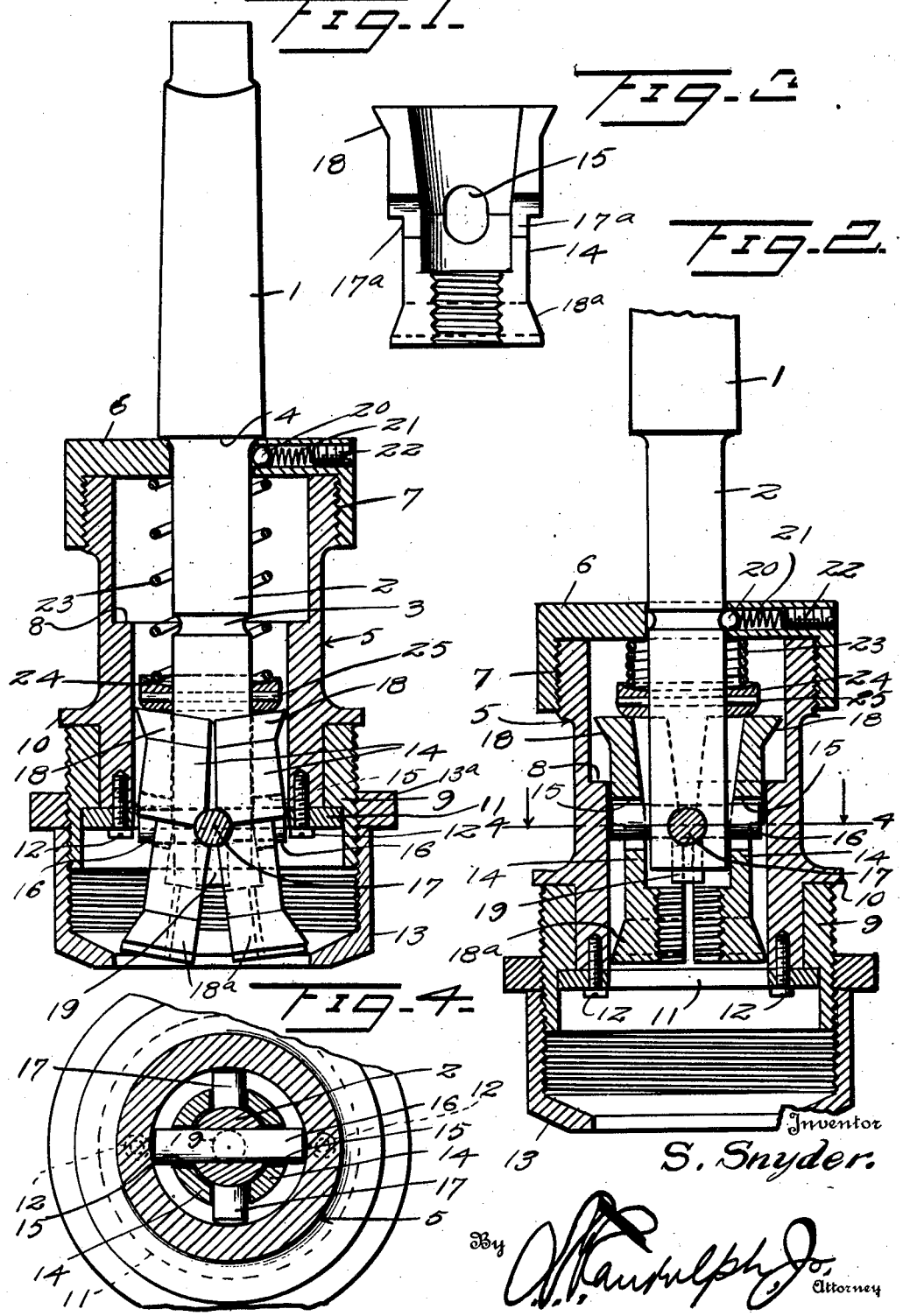
Inventor
S. Snyder.

Patented Nov. 23, 1926.

1,607,804

UNITED STATES PATENT OFFICE.

SIDNEY SNYDER, OF CHICAGO, ILLINOIS, ASSIGNOR TO EDWARD C. LANGE, OF CHICAGO, ILLINOIS.

STUD DRIVER.

Application filed July 7, 1923, Serial No. 650,190. Renewed April 23, 1926.

The primary object of the present invention is the provision of a tool for driving a stud to the required depth and automatically releasing so as to lift off or clear the stud without any reverse action.

A further purpose of the invention is the provision of a stud driver which may be placed upon the stud and automatically engage the same by a relative downward movement of the body on the shank or driving stem.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a central longitudinal section showing the relation of the parts when the jaws are spread, Figure 2 is a view similar to Figure 1 showing the relation of the parts when the jaws are closed, Figure 3 is a detail side elevation of one of the jaws, and Figure 4 is a horizontal section on the line 4—4 of Figure 2.

Corresponding and like parts are referred to in the following description and designated in the several views of the drawings by like reference characters.

The tool embodies a shank or stem 1 having a reduced end portion 2 in which is formed an annular groove 3. A stop shoulder 4 is formed at the inner end of the reduced portion 2. A cylindrical body 5 is slidably mounted upon the reduced end portion 2 of the shank and is provided at its upper end with a cap 6 which is retained in place by any suitable means such as screw threads 7. The inner diameter of the lower portion of the cylindrical body 5 is reduced and forms an inner annular shoulder 8. An externally screw threaded ring 9 is fitted upon the lower reduced end of the body 5 and is confined between an outer shoulder 10 and a retaining ring 11 secured to the lower end of the body 5 by means of screws 12 and disposed within an enlarged portion of the ring 9. A set ring 13 is threaded upon the ring 9 and constitutes an adjustable stop, whereby to regulate the setting of the stud when driving the same. The set ring 13 is secured in adjusted position by a jam nut 13ª.

Complemental jaws 14 have pivotal connection with the reduced end 2 of shank 1, each of the jaws being provided intermediate its ends with an opening 15 to receive the projecting end of a driving pin 16 fitted in an opening of the shank 1. The openings 15 are slightly larger than the ends of the pin 16 to admit of a limited longitudinal play of the jaws whereby their threaded gripping ends may readily adapt themselves to the threaded end of the stud when placing the tool in position. An evener pin 17 carried by the reduced end of the shank 1 has its opposite ends projecting and adapted to engage notched portions 17ª of the jaws 14, whereby to even the same when placing the tool in position upon a stud preliminary to driving the same. The gripping ends of the jaws 14 project beyond the reduced portion 2 of the shank 1 and their inner or gripping faces are formed with screw thread sections to match the threaded ends of the studs to be driven. The upper and lower ends of the jaws 14 have inclined portions 18 and 18ª, respectively, which are adapted to ride upon the inner wall of the reduced portion of the body 5 whereby to effect a spreading or a closing of the gripping ends of the jaws 14, as indicated most clearly in Figures 1 and 2. When the body 5 is pressed downwardly, it rides upon the lower inclined ends 18ª and compresses the gripping ends of the jaws 14 and closes them upon the stud and holds the same securely. A stop pin 19 fitted in an opening in the lower end of the shank 1 limits the movement of the tool when applying the same to a stud to be driven.

A spring actuated catch holds the body 5 when moved downwardly upon the reduced end 2 of the shank 1. This catch consists of a ball 20 which is pressed inwardly by means of a spring 21, the tension of said spring being regulated by a set screw 22. The cap 6 has an opening formed therein to receive the parts 20, 21 and 22. When the body 5 is pressed downwardly upon the reduced end 2 of the shank 1, the catch 20 enters the groove 3 and holds the body 5 in the adjusted position. The set ring 13 being adjusted, determines the driving of the stud so that the projecting ends of a plurality of studs will be uniform. When the set ring 13 comes in contact with the part in which the stud is driven, the pressure exerted thereon overcomes the pressure of the spring 21 holding the catch 20 in the groove 3, thereby automatically releasing the body 5. The instant the body 5 is released, it is moved upwardly by means of an expansible helical spring 23 disposed in the upper portion thereof and confined between the cap 6 and a washer 24 secured to the shank 1 by a pin 25. As the body 5 reaches the limit of its upward movement, the shoulder 8 at the top of its lower reduced portion engages and rides upon the inclined ends 18 of the jaws 14 and compresses such ends, thereby effecting a spreading or opening of the gripping ends of the jaws and an automatic release of the tool from the stud. The tool is now in position to be applied to the next stud to be driven and after being placed in position thereon, the body 5 is moved downwardly thereby compressing the gripping ends of the jaws and holding the tool in engagement with the stud, the body 5 when reaching the limit of its downward movement being held in the adjusted position by means of the catch 20 in the manner herein stated.

What is claimed is:

1. A tool for driving studs, the same comprising a shank, complemental jaws arranged lengthwise of the shank and pivoted thereto, said jaws having inclined faces on their upper and lower ends, a member slidable on the shank and co-operating with said inclined faces to effect an opening and a closing of the jaws, and a catch for holding said member in position to maintain the jaws in closed position.

2. A tool for driving studs, the same comprising a shank, complemental jaws arranged lengthwise of the shank and pivoted intermediate their ends thereto, said jaws having inclined faces on their upper and lower ends, a member slidable upon the shank and jaws and co-operating with said inclined faces to effect an opening and a closing of the jaws, an expansible helical spring for normally maintaining said member in given position with the jaws open, and a catch to maintain said member in position against the tension of said spring to maintain the jaws in closed position.

3. A tool for driving studs, the same comprising a shank, complemental jaws arranged lengthwise of the shank and pivoted intermediate their ends thereto, a member slidable upon the shank and jaws to effect an opening and a closing of the latter, an expansible helical spring for normally maintaining said member in given position with the jaws open, a catch to maintain said member in position against the tension of said spring to maintain the jaws in closed position, and a set ring having adjustable connection with said member and adapted to effect automatic release of the catch.

4. A tool for driving studs, the same comprising a shank, complemental jaws arranged lengthwise of the shank and pivoted intermediate their ends thereto, a member slidable upon the shank and jaws to effect an opening and a closing of the latter, an expansible helical spring for normally maintaining said member in given position with the jaws open, a catch to maintain said member in position against the tension of said spring to maintain the jaws in closed position, a stop carried by the shank for properly positioning the tool when applied to a stud, and a set ring having adjustable connection with said member whereby to effect automatic release of the catch when the stud has been driven to the predetermined extent.

5. A tool of the character specified comprising a shank having a reduced end portion formed with an annular groove, a stop pin fitted to the lower end of the shank, drive and evener pins applied to the reduced portion of the shank, complemental jaws arranged at the sides of the reduced portion of the shank and pivotally mounted upon the projecting ends of the drive pin and notched to coact with the evener pin, a cylindrical body slidable upon the reduced end of the shank and having its lower portion reduced to form an inner shoulder, a cap secured to the upper end of the body, a spring actuated catch carried by said cap and adapted to engage the groove formed in the reduced end portion of the shank, an externally threaded ring fitted upon the lower end of the body, a set ring threaded to the before mentioned ring, and an expansible helical spring within the upper portion of the body and normally exerting a pressure to hold said body in elevated position upon the reduced end portion of the shank.

In testimony whereof I affix my signature.

SIDNEY SNYDER.